United States Patent
Regaud et al.

(10) Patent No.: US 12,534,185 B2
(45) Date of Patent: Jan. 27, 2026

(54) PROPELLER FOR AN AIRCRAFT PROPULSION ASSEMBLY, PROPULSION ASSEMBLY, AND METHOD FOR THE USE OF SUCH A PROPULSION ASSEMBLY

(71) Applicant: SAFRAN HELICOPTER ENGINES, Bordes (FR)

(72) Inventors: Pierre-Luc Regaud, Moissy-Cramayel (FR); Didier Claude Chartrain, Moissy-Cramayel (FR); Sebastien Combebias, Moissy-Cramayel (FR); Thomas Drouin, Moissy-Cramayel (FR); Camel Serghine, Moissy-Cramayel (FR); Laurent Pierre Tarnowski, Moissy-Cramayel (FR); Michael Derderian, Frontenas (FR); Vincent Duqueine, Frontenas (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/580,862

(22) PCT Filed: Jul. 18, 2022

(86) PCT No.: PCT/EP2022/070058
§ 371 (c)(1),
(2) Date: Jan. 19, 2024

(87) PCT Pub. No.: WO2023/006473
PCT Pub. Date: Feb. 2, 2023

(65) Prior Publication Data
US 2024/0228018 A1    Jul. 11, 2024

(30) Foreign Application Priority Data
Jul. 29, 2021   (FR) ........................................ 2108228

(51) Int. Cl.
*B64C 11/02* (2006.01)
*B64C 11/14* (2006.01)
(Continued)

(52) U.S. Cl.
CPC .............. *B64C 11/02* (2013.01); *B64C 11/14* (2013.01); *B64C 11/16* (2013.01); *B64D 27/31* (2024.01); *B64D 27/34* (2024.01)

(58) Field of Classification Search
CPC ........... B64C 11/14; B64C 11/16; H02K 5/18; B64U 20/94
See application file for complete search history.

(56) References Cited

U.S. PATENT DOCUMENTS

| 2006/0102780 A1* | 5/2006 | Parks | B64D 33/08 244/53 B |
| 2018/0266440 A1* | 9/2018 | Shiozawa | H02K 9/06 |
| 2022/0010811 A1* | 1/2022 | Kim | H02K 9/06 |

FOREIGN PATENT DOCUMENTS

| CN | 114046260 A * | 2/2022 | ............. H02K 5/18 |
| DE | 102018209204 B4 * | 6/2020 | ............. F01D 25/12 |

(Continued)

OTHER PUBLICATIONS

International Search Report from corresponding PCT/EP2022/070058 dated Sep. 15, 2022, 6 pages.
(Continued)

*Primary Examiner* — Courtney D Heinle
*Assistant Examiner* — Ryan C Clark
(74) *Attorney, Agent, or Firm* — RANKIN, HILL & CLARK LLP

(57) ABSTRACT

A propeller for an aircraft propulsion assembly extending longitudinally along an axis X. The propeller comprising a propeller cone, blades, a guide member extending longitudinally along the axis X and rotating as one with the
(Continued)

propeller cone, the guide member being mounted outside the propeller cone in such a way as to form between them a guide path, the guide member having an upstream opening configured to convey a flow of air in the guide path and a downstream opening in such a way as to remove the flow of air downstream, the guide member having through-orifices through which extend the blades of the propeller and compressor vanes, which rotate as one with the propeller cone and which are positioned in the guide path in such a way as to generate an accelerated air flow.

13 Claims, 3 Drawing Sheets

(51) Int. Cl.
*B64C 11/16* (2006.01)
*B64D 27/31* (2024.01)
*B64D 27/34* (2024.01)

(56) References Cited

FOREIGN PATENT DOCUMENTS

| FR | 3063403 A1 * | 8/2018 | ............... H02K 5/18 |
| GB | 260043 A * | 7/1925 | ............. B64C 11/14 |
| GB | 2587668 | 4/2021 | |
| GB | 2369161 A * | 5/2022 | ............. B64C 11/14 |
| WO | 2007/001372 | 1/2007 | |
| WO | 2021/112940 | 6/2021 | |
| WO | WO-2022078092 A1 * | 4/2022 | ............. B64C 27/08 |

OTHER PUBLICATIONS

French Search Report from corresponding application No. FR2108228, dated Mar. 23, 2022, 3 pages.

* cited by examiner

PROPELLER FOR AN AIRCRAFT PROPULSION ASSEMBLY, PROPULSION ASSEMBLY, AND METHOD FOR THE USE OF SUCH A PROPULSION ASSEMBLY

TECHNICAL FIELD

The present invention relates to the field of propulsion assemblies for aircraft, in particular, a propulsion assembly comprising an electric motor for driving a propeller to ensure the electric propulsion of an aircraft.

In order to reduce the use of fossil energy, it has been proposed to use electric motors to rotationally drive a propulsion propeller, i.e. vanes without an outer casing.

A propulsion assembly comprising an electric motor comprising a rotor shaft driving a propeller that comprises a propeller cone extending longitudinally along an axis and blades extending radially from the propeller cone is already known in the prior art. The rotation of the blades allows the aircraft to be propelled, i.e. its longitudinal displacement upstream.

An electric motor comprises electrical components that have to be cooled during its use. In a known manner, the electric motor is cooled by its coming into contact with an external air flow. When the aircraft is on the ground or moving at reduced speed, the airflow is too low to ensure sufficient cooling. To eliminate this drawback, an immediate solution would be to use another cooling fluid, but this would greatly penalize the mass and the bulk.

The invention thus aims to eliminate at least some of these drawbacks by proposing a propulsion assembly allowing optimum cooling of an electric motor and not impacting the mass and the bulk.

A turbomachine mounted in a housing comprising an air path to allow cooling of the turbomachine is known from patent application WO2007001372A2. It teaches a propeller cone from which radial blades extend. GB2587668A relates to a thermal management system of a turbomachine by using an air flow taken from the vicinity of a propeller cone.

SUMMARY

The invention relates to a propeller for aircraft propulsion assembly extending longitudinally along an axis X, the propeller being configured to be positioned upstream in the propulsion assembly and rotationally driven around said axis X, the propeller comprising:
  a propeller cone and
  blades extending radially with respect to said axis X from the propeller cone,
  The propeller is remarkable by the fact that it comprises:
  a guide member extending longitudinally along the axis X which is rotationally integral with the propeller cone, the guide member being mounted outside the propeller cone in such a way as to form between them a guide path, the guide member comprising an upstream opening configured to convey an air flow into the guide path and a downstream opening in such a way as to remove the air flow downstream, the guide member comprising through-orifices through which extend the blades of the propeller and
  compressor vanes, rotationally integral with the propeller cone, which are positioned in the guide path in such a way as to generate an accelerated air flow.

Thanks to the invention, the propeller makes it possible to internally accelerate and compress an air flow, taken upstream from the external medium, to remove it downstream in such a way that it can cool a device positioned downstream. Such a propeller is particularly advantageous for cooling the rotating drive device of the propeller which is placed directly downstream of the propeller. The cooling is advantageously efficient even when the relative speed of the external air flow (aircraft speed) is low or zero. The cooling is in particular optimal when the drive is carried out by an electric motor that generates calories that need to be removed.

Preferably, the guide member comprises an upstream lip that is profiled. This is advantageous to allow an upstream intake which is efficient for different incidences of the upstream air flow.

Preferably, the compressor vanes extend over the entire radial thickness of the guide path. In this way, the compression is optimal.

Preferably, the propeller cone comprises a closed upstream end in order to improve its aerodynamic performance.

Preferably, the guide member and the propeller cone are coaxial.

According to one aspect, the radial section of the guide path is decreasing from upstream to downstream in order to increase the compression rate and improve cooling.

Preferably, the guide member and the propeller cone have the same longitudinal length in order to form a compact assembly.

Preferably, the compressor vanes are made of material of the guide member and/or the propeller cone. This makes it possible to reduce the mass and to form a compact assembly.

The invention also relates to an aircraft propulsion assembly extending longitudinally along an axis X oriented from downstream to upstream, comprising a propeller, as previously presented, positioned upstream, and an electric motor, positioned downstream, configured to rotationally drive the propeller along the axis X in such a way as to cool the electric motor with an accelerated air flow.

As a result, the electric motor benefits from efficient cooling even when the aircraft has low or no speed.

Preferably, the assembly comprises straightener vanes mounted at the outlet of the air path in such a way as to straighten the accelerated air flow. During compression, the air flow is twisted on account of the rotation of the compressor vanes. The straightener vanes make it possible to straighten the air flow in order that it extends parallel to the axis X, which is optimal for cooling the electric motor which is axially aligned with the axis X to drive the propeller. Preferably, the straightener vanes are fixed or with variable pitch.

Preferably, the straightener vanes are integral with the electric motor in such a way as to allow optimal and precise straightening to cool the electric motor.

According to one aspect of the invention, the electric motor comprises rows of cooling fins. The straightener vanes form a row of cooling fins, preferably the most upstream row. The straightener vanes advantageously fulfill a dual function by making it possible, on the one hand, to straighten the accelerated air flow in the air path and, on the other hand, to conduct calories from the electric motor. Cooling and compactness are improved.

Preferably, the straightener vanes are spaced apart from the propeller by a longitudinal clearance comprised between 1 and 10 mm. Such a longitudinal clearance makes it possible to ensure a compromise between, on the one hand, a sufficient spacing guaranteeing security between a moving member and a fixed member and, on the other hand, a sufficient seal allowing effective compression.

The invention relates to an aircraft comprising at least one propulsion assembly as presented previously. According to one aspect, the aircraft comprising at least one wing, the propulsion assembly being mounted on the wing. The use of several electric propulsion assemblies on a wing makes it possible to reduce carbon emissions. Cooling remains efficient. According to another aspect, the aircraft comprises a nacelle in which said propulsion assembly is mounted. The nacelle may be installed in the nose of the aircraft or elsewhere. Such a propulsion assembly may be used for vertical take-off and/or propulsion at cruising speed. Such a propulsion assembly may thus form a central propulsion assembly.

The invention further relates to a method of using a propulsion assembly as presented previously, method comprising steps consisting of:
Driving the propeller by the electric motor in order that the blades provide a propulsion force, and
Cooling the electric motor by accelerating an air flow in the air path by the compressor vanes.

DESCRIPTION OF THE DRAWINGS

The invention will be better understood upon reading the following description, given as an example, and referring to the following figures, given as non-limiting examples, in which identical references are given to similar objects.

It should be noted that the figures set out the invention in detail in order to implement the invention, said figures may of course be used to better define the invention where applicable.

DETAILED DESCRIPTION

The invention will be presented for an aircraft A comprising two wings W on which are mounted several propulsion assemblies 1 according to the invention. The propulsion assemblies 1 advantageously enable an electrical propulsion. In this example, the aircraft A further comprises upstream of the fuselage a central propulsion assembly 10 which is electrical or thermal in order to enable a hybrid propulsion.

Figure 1:
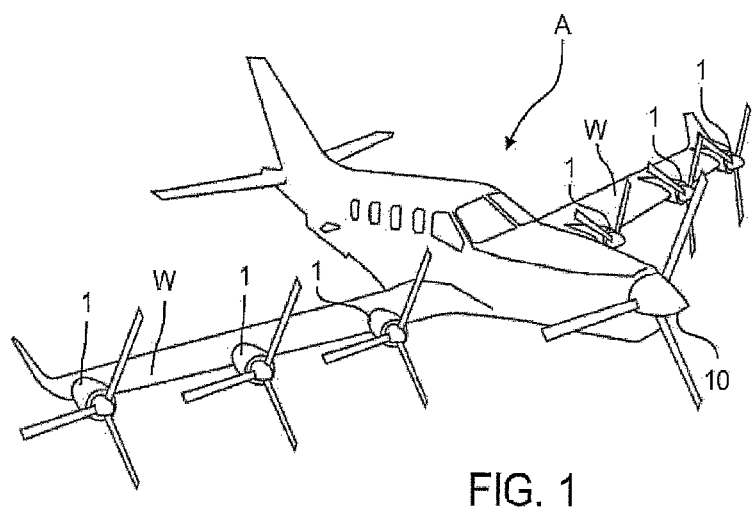
FIG. 1 is a schematic representation of an aircraft according to one embodiment of the invention.
Figure 2:
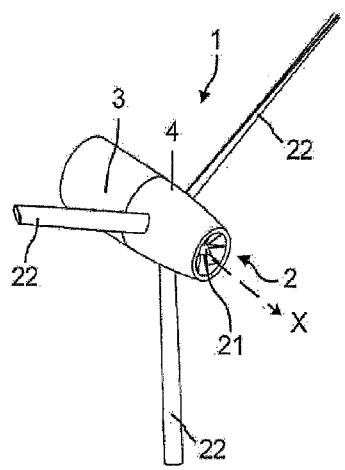
FIG. 2 is a schematic representation of a propulsion assembly according to the invention.
Figure 3:
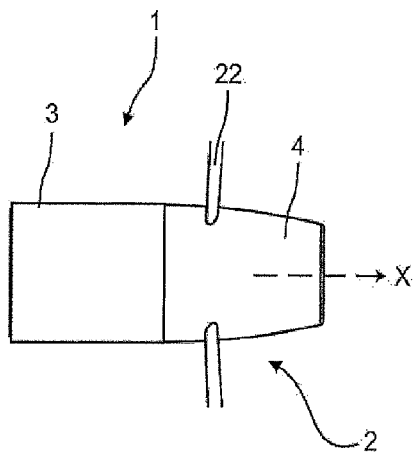
FIG. 3 is a schematic side representation of the propulsion assembly of [FIG. 2].
Figure 4:
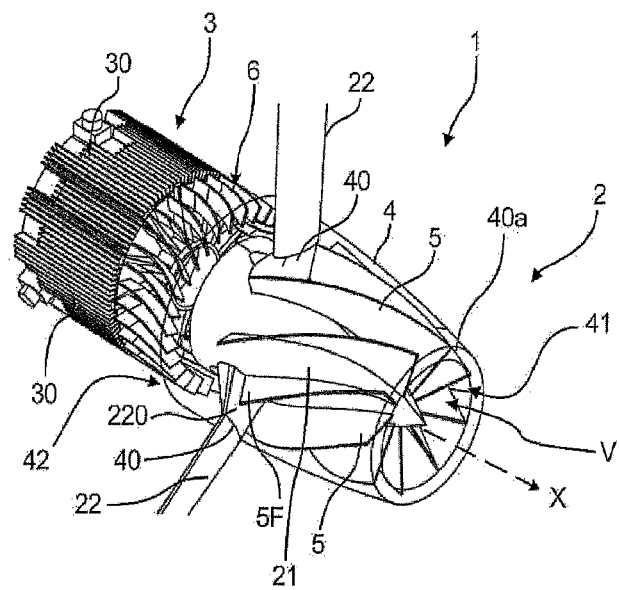
FIG. 4 is a schematic representation of the propulsion assembly of [FIG. 3] with the guide cone shown in transparency.

A propulsion assembly 1 according to one embodiment of the invention will be presented in detail with reference to FIGS. 2 to 4.

The propulsion assembly 1 extends longitudinally along an axis X oriented from downstream to upstream. The propulsion assembly 1 comprises a propeller 2, positioned upstream, and an electric motor 3, positioned downstream, configured to rotationally drive the propeller 2 along the axis X.

Electric Motor 3

The electric motor 3 comprises in a known manner a stator part and a rotor part comprising a rotor shaft connected to the propeller 2. Preferably, the electric motor 3 comprises components that require cooling, for example, electrical components, power components, magnetic windings and others. As illustrated in [FIG. 4], the electric motor 3 comprises a plurality of fins 30 protruding on its outer surface which are configured to be cooled by the circulation of an external air flow. The fins 30 allow the calories of the electric motor 3 to be conducted to its outer surface.

Propeller 2

With reference to [FIG. 4], the propeller 2 comprises a propeller cone 21 and propeller blades 22 extending radially relative to said axis X from the propeller cone 21. Preferably, the blades 22 are 3 in number but their number could be different. The blades 22 are preferably angularly distributed on the propeller cone 21. In this example, the electric motor 3 is connected to the propeller 2 by cooperation of the rotor shaft internally to the propeller cone 21.

According to the invention, with reference to [FIG. 4], the propeller 2 comprises a guide member 4 extending longitudinally along the axis X which is rotationally integral with the propeller cone 21. Preferably, the guide member 4 and the propeller cone 21 are coaxial and interlocked to form a propeller 2 that is compact.

Guide Member 4

The guide member 4 is mounted outside the propeller cone 21 in such a way as to form between them a guide path V, the guide member 4 comprising an upstream opening 41 configured to convey an air flow F into the guide path V and a downstream opening 42 in such a way as to remove the air flow to the electric motor 3. Preferably, the radial thickness of the air path V is decreasing from upstream to downstream in such a way as to increase the compression of the air flow F. As illustrated in [FIG. 4], the guide member 4 comprises through-orifices 40 through which extend the blades 22 of the propeller 2.

Preferably, the guide member 4 is in the form of a section of a conical shell in such a way as to form a guide path of calibrated section. Preferably, the guide member 4 and the propeller cone 21 have the same longitudinal length.

Figure 5:
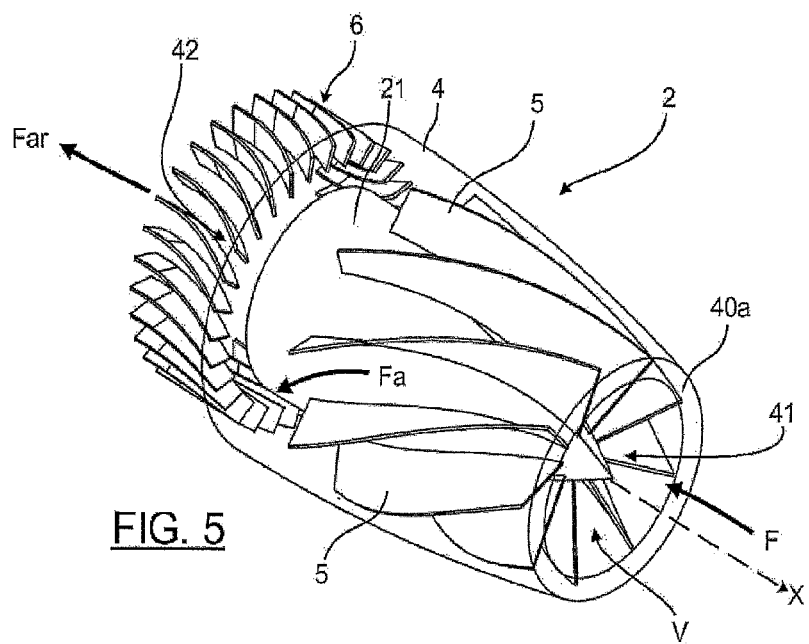
FIG. 5 is a schematic representation of the propulsion assembly without the propeller blades.
Figure 6:
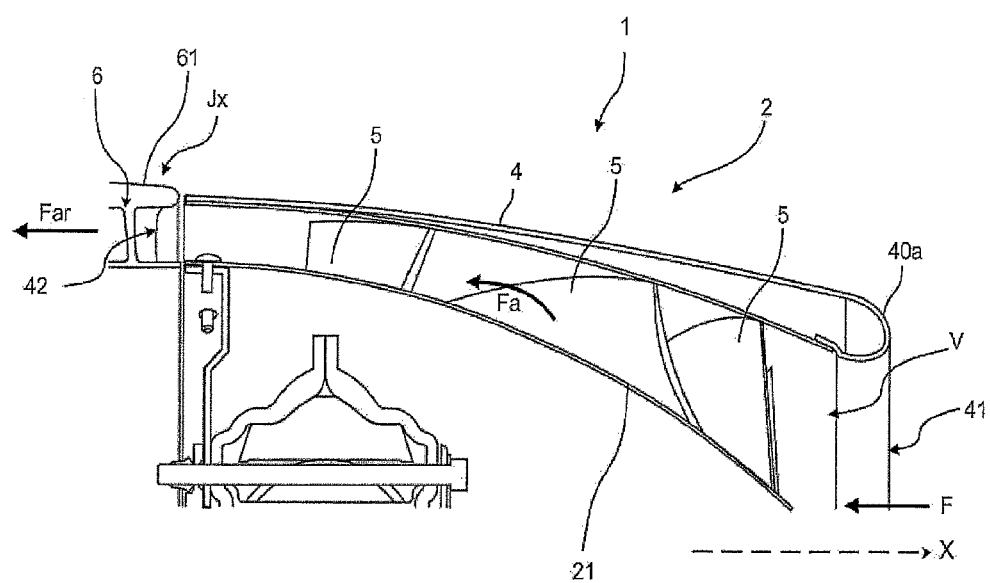
FIG. 6 is a schematic representation in longitudinal half-section of the propeller of the propulsion assembly.

With reference to FIGS. 5 and 6, the guide member 4 comprises an upstream lip 40A which is profiled in such a way as to allow air to be admitted into the air path V in an optimal manner for different air flow incidences and for different operating points, which allows optimum compression as will be presented below.

Compressor Vanes 5

According to the invention, with reference to [FIG. 4], the propeller 2 comprises compressor vanes 5, rotationally integral with the propeller cone 21, which are positioned in the guide path V in such a way as to cool the electric motor 3 with an accelerated air flow Fa. In this way, even if the relative speed of the external air is low (aircraft stopped or low forward speed), the propeller 2 makes it possible to accelerate the external air in such a way as to remove a plurality of calories from the electric motor 3.

Preferably, the compressor vanes 5 extend over the entire radial thickness of the guide path V by joining the outer surface of the propeller cone 21 and the inner surface of the guide member 4. Preferably, the section of the air path V is decreasing from upstream to downstream to increase compression. The radial thickness of the compressor vanes 5 is also decreasing from upstream to downstream. In this example, each compression vane 5 has a twisted shape in such a way as to enable an optimum compression. With reference to [FIG. 5], an axial air flow F is admitted at the level of the opening 41 then accelerated by the compressor vanes 5 in order to form an accelerated air flow Fa. The propeller cone 21, the guide member 4 and the compressor vanes 5 together form a "mixed" or "impeller-centrifugal" type compressor.

Preferably, the compressor vanes 5 are made of the same material as the guide member 4 and/or the propeller cone 21. Preferably, the compressor vanes 5 are derived from material of the guide member 4 and/or the propeller cone 21 in order to form a one-piece assembly and limit the overall mass.

The number of compressor vanes 5 is independent of the number of blades 22 that ensure the propulsion, which makes it possible to optimize their respective numbers in order to best meet the performances of the propulsion assembly 1 by adapting, on the one hand, the flow rate to ensure heat transfer and, on the other hand, the compression ratio to counteract pressure losses.

The relative pitch of the compressor vanes 5 with respect to the blades 22 is optimized in order to limit aerodynamic interactions and improve cooling. Preferably, in order to limit interactions at the level of the root 220 of the blades 22 that extend into the air path V, the trailing edge 5F of one of the compressor vanes 5 is centered on the root 220 of the blade 22 as illustrated in [FIG. 4].

Preferably, the compressor vanes 5 are distinct from the blades 22, in particular, the root of a blade 22. This advantageously makes it possible to optimize the compression and the propulsion. Preferably, each compressor vane 5 has an axial length at least two times, preferably at least three times, greater than the axial length of the root of a blade 22. The compression is then optimized.

Straightener Vanes 6

According to one aspect of the invention, with reference to [FIG. 5], straightener vanes 6 are mounted at the outlet of the air path V in such a way as to straighten the accelerated air flow Fa which is twisted at the outlet of the compressor vanes 5 in order to obtain an accelerated and straightened air flow Far to axially cool the outer periphery of the electric motor 3. All of the straightener vanes 6 form an axial or conical type straightener. The straightener vanes 6 may be fixed or with adjustable/variable pitch. Such straightener vanes 6 make it possible to reduce pressure losses by aligning the air flow with the electric motor 3 for a wide operating range.

As previously presented, the electric motor 3 comprises, on its periphery, cooling fins 30 which are cooled by the air flow. Preferably, the straightener vanes 6 are integral with the electric motor 3 in order to ensure precise positioning and optimal circulation for the cooling. According to one alternative, the straightener vanes 6 form a row of cooling fins 30 of the electric motor 3, preferably the most upstream row. In other words, the straightener vanes 6 are integrated in the electric motor 3 and make it possible to straighten and to remove calories from the electric motor 3.

The straightener vanes 6 may be made of various materials meeting the thermomechanical resistance requirements and may be obtained by different methods, in particular, by additive manufacturing.

It goes without saying that the straightener vanes 6 could belong to an independent element that could be mounted between the guide member 4 and the electric motor 3.

With reference to [FIG. 6], the straightener vanes 6 are spaced apart from the propeller 2 by a longitudinal clearance Jx comprised between 1 and 10 mm which makes it possible to prevent any contact between the propeller 2 (moving) and the straightener vanes 6 (fixed) while making it possible to limit any air leak.

A straightener lip 61, preferably profiled, is positioned outside the straightener vanes 6 to favor the flow of the accelerated air flow Fa to the straightener vanes 6. Preferably, the straightener lip 61 is longitudinally aligned with the rear end of the guide member 4 to facilitate a guiding internally to the straightener lip 61.

Method of Use

The invention also relates to a method of using a propulsion assembly 1, as presented previously, comprising steps consisting of driving the propeller 2 by the electric motor 3 in order that the blades 22 provide a propulsion force, and cooling the electric motor 3 by acceleration of an air flow F in the air path V by the compressor vanes 5. Advantageously, as soon as the electric motor 3 is used, an accelerated air flow Fa is directly generated to allow cooling. In this way, any risk of overheating of the electric motor 3 is avoided.

The bulk of the propeller 2 remains limited, which is advantageous.

The invention claimed is:

1. A propeller for a propulsion assembly of an aircraft extending longitudinally along an axis X, the propeller being configured to be positioned upstream in the propulsion assembly and rotationally driven around said axis X, the propeller comprising:
   a propeller cone,
   blades extending radially with respect to said axis X from the propeller cone,
   a guide member extending longitudinally along the axis X which is rotationally integral with the propeller cone, the guide member being mounted outside the propeller cone in such a way as to form between them a guide path, the guide member comprising an upstream opening configured to convey an air flow into the guide path and a downstream opening in such a way as to remove the air flow downstream, wherein a radial section of the guide path decreases from when traveling from upstream to downstream, and wherein the guide member defines through-orifices through which extend the blades of the propeller, and
   compressor vanes that radially extend from the propeller cone to the guide member so as to define a radial thickness that decreases when traveling from the upstream to the downstream, wherein the compressor vanes are rotationally integral with the propeller cone and wherein the radially decreasing compressor vanes are positioned in the guide path and cooperate with the decreasing radial section of the guide path so as to generate an accelerated air flow.

2. The propeller according to claim 1, wherein the guide member comprises an upstream lip that is profiled.

3. The propeller according to claim 1, wherein the compressor vanes extend over an entire radial thickness of the guide path.

4. The propeller according to claim 1, wherein the propeller cone comprises a closed upstream end.

5. The propeller according to claim 1, wherein the compressor vanes are derived from material of the guide member and/or the propeller cone.

6. A propulsion assembly for an aircraft extending longitudinally along an axis X oriented from downstream to upstream, comprising:
   a propeller comprising a propeller cone, blades extending radially with respect to said axis X from the propeller cone, a guide member extending longitudinally along the axis X which is rotationally integral with the propeller cone, the guide member being mounted outside the propeller cone in such a way as to form between them a guide path, the guide member comprising an upstream opening configured to convey an air flow into the guide path and a downstream opening in such a way as to remove the air flow downstream, wherein a radial section of the guide path decreases from when traveling from upstream to downstream, and wherein the guide member defines through-orifices through which extend the blades of the propeller, and compressor vanes that radially extend from the propeller cone to the guide member so as to define a radial thickness that decreases when traveling from the upstream to the downstream, wherein the compressor vanes are rotationally integral with the propeller cone, and wherein the radially decreasing compressor vanes are positioned in the guide path and cooperate with the decreasing radial section of the guide path so as to generate an accelerated air flow, and an electric motor, positioned downstream, configured to rotationally drive the propeller along the axis X in such a way as to cool the electric motor with an accelerated air flow.

7. The propulsion assembly according to claim 6, further comprising straightener vanes mounted at an outlet of an air path in such a way as to straighten the accelerated air flow.

8. The propulsion assembly according to claim 7, wherein the straightener vanes are integral with the electric motor.

9. The propulsion assembly according to claim 8, wherein the electric motor comprises rows of cooling fins, and wherein the straightener vanes form a row of the cooling fins.

10. The aircraft, comprising at least one propulsion assembly according to claim 6.

11. The aircraft according to claim 10, further comprising at least one wing, the propulsion assembly being mounted on the wing.

12. The aircraft according to claim 10, further comprising at least one nacelle, the propulsion assembly being mounted in said nacelle.

13. A method of using the propulsion assembly according to claim 6, the method comprising the steps of:
 driving the propeller by the electric motor so that the blades provide a propulsion force, and
 cooling the electric motor by accelerating the air flow in an air path by the compressor vanes.

* * * * *